United States Patent
Huibers et al.

(10) Patent No.: US 7,034,985 B1
(45) Date of Patent: Apr. 25, 2006

(54) ASYMMETRIC SPATIAL LIGHT MODULATOR IN A PACKAGE

(75) Inventors: Andrew Huibers, Palo Alto, CA (US); Regis Grasser, Mountain View, CA (US)

(73) Assignee: Reflectivity, Inc., Sunnyvale, CA (US)

( * ) Notice: Subject to any disclaimer, the term of this patent is extended or adjusted under 35 U.S.C. 154(b) by 52 days.

(21) Appl. No.: 10/969,300

(22) Filed: Oct. 19, 2004

(51) Int. Cl.
*G02B 26/00* (2006.01)
*G02B 26/08* (2006.01)

(52) U.S. Cl. .................. 359/291; 359/290; 359/298; 359/214

(58) Field of Classification Search ........ 359/290–295, 359/298, 214, 572; 345/84, 92, 690, 691, 345/204–206; 257/415, 680, 682; 438/104; 348/771, 759; 355/35, 44, 67
See application file for complete search history.

(56) References Cited

U.S. PATENT DOCUMENTS

| | | | | |
|---|---|---|---|---|
| 4,421,381 A * | 12/1983 | Ueda et al. | ................. | 359/214 |
| 5,490,009 A * | 2/1996 | Venkateswar et al. | ...... | 359/291 |
| 5,583,688 A * | 12/1996 | Hornbeck | ................... | 359/291 |
| 6,266,176 B1 * | 7/2001 | Anderson et al. | ........... | 359/245 |
| 6,356,378 B1 * | 3/2002 | Huibers | ..................... | 359/291 |
| 6,388,661 B1 * | 5/2002 | Richards | ..................... | 345/204 |
| 6,574,032 B1 * | 6/2003 | Roddy et al. | ............... | 359/290 |
| 6,775,049 B1 * | 8/2004 | So | .............. | 359/291 |
| 6,798,561 B1 * | 9/2004 | Huibers | ..................... | 359/291 |
| 6,825,968 B1 * | 11/2004 | Aubuchon | ................... | 359/290 |
| 6,831,768 B1 * | 12/2004 | Cebuhar et al. | ............ | 359/291 |
| 6,886,944 B1 * | 5/2005 | Dahlgren | ..................... | 353/97 |

* cited by examiner

*Primary Examiner*—Loha Ben
(74) *Attorney, Agent, or Firm*—Gregory R. Muir

(57) ABSTRACT

Disclosed herein is a micromirror package having a micromirror being attached to a supporting surface of a package substrate, and sealed between the package substrate and a package cover, whereas the micromirror array is placed offset the center of the supporting surface.

71 Claims, 7 Drawing Sheets

ASYMMETRIC SPATIAL LIGHT MODULATOR IN A PACKAGE

TECHNICAL FIELD OF THE INVENTION

The present invention is generally related to the art of microelectromechanical devices, and more particularly, to micromirror array devices for use in display systems.

BACKGROUND OF THE INVENTION

Projection display systems employing spatial light modulators require an exact direction of light so as to obtain a clear and undistorted image. Undesired light, such as light scattered by the components of the spatial light modulator, that reaches the display target of the display system will negatively effect the displayed image, distorting the object being viewed. An approach to solve this problem is to include a light-blocking device, such as a black mask or inactive area, inside the spatial light modulator.

Micromirrors are key components of microelectromechanical system (MEMS)—based spatial light modulators. A typical MEMS-based spatial light modulator usually comprises an array of miniature micromirrors. These micromirrors are selectively deflected, for example, in response to an electrostatic force, which in turn selectively reflect incident light to produce digital images. Therefore, undesired light can be prevented from reaching the target by turning the mirrors in the border areas to their inactive state. An inactive state is a state that is not associated with the image data of the image to be displayed in the display system. For this and other reasons, micromirror array devices, as well as other image engines such as liquid crystal devices or the like may include inactive areas in borders on all sides to avoid undesired light scattering.

In current spatial light modulators, the micromirror array devices are sealed within spaces between package covers and package substrates for protection purposes. The package covers either themselves are transmissive to the incident light, or comprise inlay windows that are transmissive to the incident light. In either configuration, the micromirror device array is aligned to the center of the package cover or the center of the inlay window of the package cover. In the presence of a light blocking mask, when the illumination light is incident at an angle to the surface of the micromirror array in the spatial light modulator, a group of micromirrors in the array will not be illuminated, and the modulated light from another group of micromirrors in the array will not be able to escape the package. As a result, the desired image will not be properly produced in the display target.

SUMMARY OF THE INVENTION

In view of the foregoing, the present invention discloses a spatial light modulator having an array of micromirror devices. The micromirror array is positioned within a space between a package cover and package substrate of a device package. The package cover comprises a light absorbing mask defining a window through which the illumination light passes and is incident to the micromirrors.

In an example of the invention, the light absorbing mask is asymmetric with the opening window being offset from the center of the mask. The micromirror array is positioned with its center offset from the window defined by the mask. In particular, the micromirror array is aligned to the front of the illumination light to be modulated by the micromirror array.

In another example, the micromirror is positioned such that the active area of the micromirror array is offset from the window, but aligned to the front of the illumination light to be modulated. The active area, however, may not be located at the center of the micromirror array. Instead, the active area can be offset from the center of the micromirror array.

The objects and advantages of the present invention will be obvious, and in part appear hereafter and are accomplished by the present invention. Such objects of the invention are achieved in the features of the independent claims attached hereto. Preferred embodiments are characterized in the dependent claims.

BRIEF DESCRIPTION OF THE DRAWINGS

The accompanying drawings are illustrative and are not to scale. In addition, some elements are omitted from the drawings to more clearly illustrate the embodiments. While the appended claims set forth the features of the present invention with particularity, the invention, together with its objects and advantages, may be best understood from the following detailed description taken in conjunction with the accompanying drawings, in which:

DETAILED DESCRIPTION OF THE INVENTION

Figure 1:
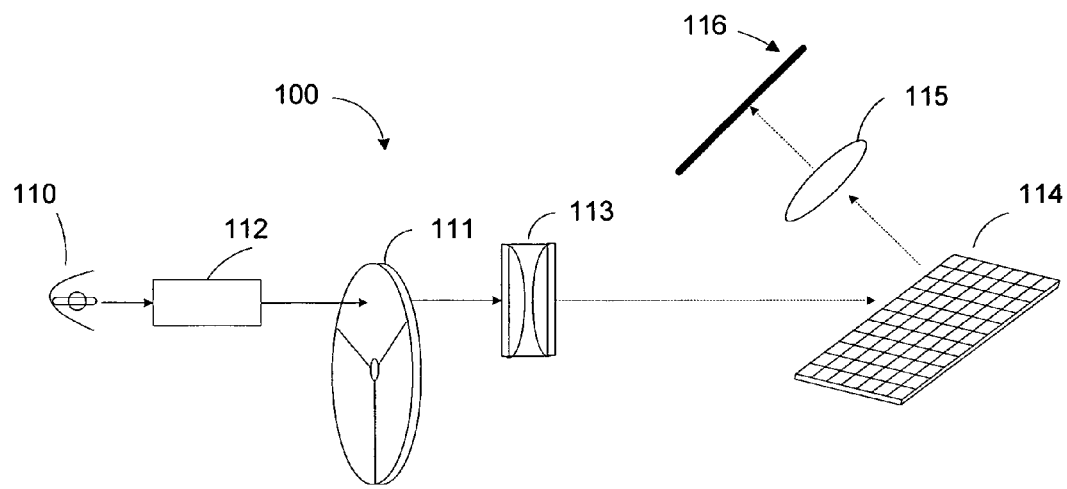
FIG. 1 is a diagram that schematically illustrates an exemplary display system employing a spatial light modulator having an array of micromirrors in a package in which embodiments of the invention can be implemented.

Turning to the drawings, FIG. 1 presents an exemplary display system that employs a spatial light modulator comprising an array of micromirrors. In its basic configuration, display system 100 comprises light source 110, optical devices (e.g. light pipe 112, condensing lens 113 and projection lens 115), display target 116 and spatial light modulator 114 that further comprises a plurality of micromirror devices (e.g. an array of micromirrors). Light source 110 (e.g. an arc lamp) emits light through the color wheel 111, the light integrator/pipe 112, and condensing lens 113 and onto spatial light modulator 114. Though the color wheel is positioned before the light pipe in this example, the color wheel may be positioned after the light pipe as well. The micromirrors of the spatial light modulator 114 are actuated selectively by a controller (e.g. as disclosed in U.S. Pat. No. 6,388,661 issued May 14, 2002, incorporated herein by reference) so as to reflect—when in their "ON" position—the incident light into projection optics 415, resulting in an image on display target 416 (screen, a viewer's eyes, a photosensitive material, etc.). Generally, more complex optical systems are often used, especially in displaying applications for color images.

Figure 2:
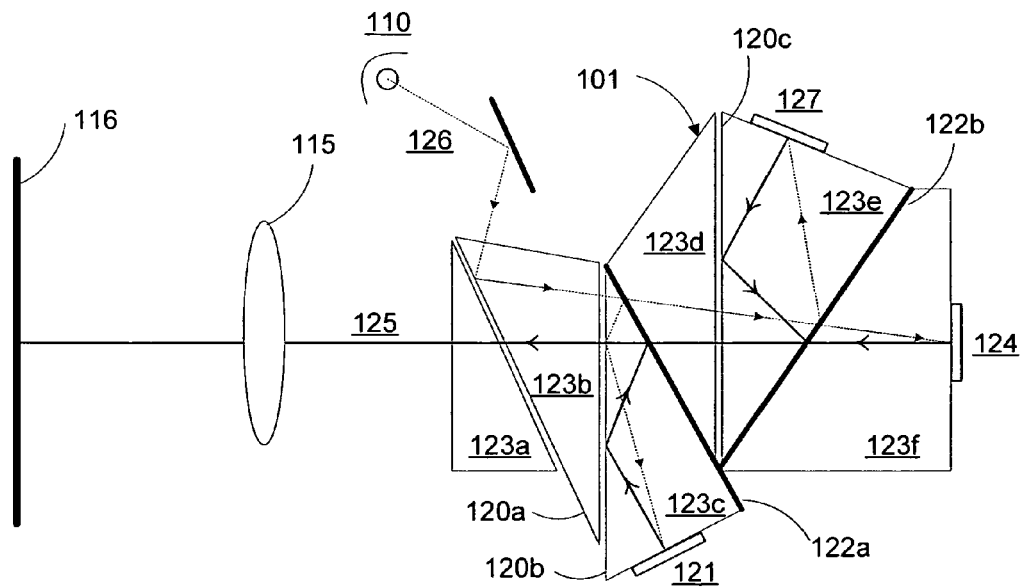
FIG. 2 illustrates therein another display system employing multiple spatial light modulators each having an array of micromirrors in a package in which embodiments of the invention can be implemented.

A display system may use multiple spatial light modulators, an exemplary such display system is illustrated in FIG. 2. Referring to FIG. 2, the display system employs three spatial light modulators 121, 124, and 127, each comprising an array of micromirrors and being designated for respectively modulating the multi-color (e.g. three primary color such as red, green, and blue, or cyan, magenta, and yellow) light beams. A dichroic prism assembly 101 is provided for splitting incident light into primary colors. For this purpose, the dichroic prism assembly comprises prisms 123a, 123b, 123c, 123d, 123e and 123f. Totally-internally-reflection (TIR) surfaces, i.e. TIR surfaces 120a, 120b, and 120c, are defined at the prism surfaces that face air gaps. The surfaces 122a and 122b of prisms 123c and 123e are coated with dichroic films, yielding dichroic surfaces. In particular, dichroic surface 122a reflects green light and transmits other light. Dichroic surface 122b reflects red light and transmits other light. The three spatial light modulators, 121, 124 and 127, each having a micromirror array device, are arranged around the prism assembly.

In operation, incident white light 126 from light source 110 enters into prism 123b and is directed towards TIR surface 120a at an angle larger than the critical TIR angle of TIR surface 120a. TIR surface 120a totally internally reflects the incident white light towards spatial light modulator 124, which is designated for modulating the blue light component of the incident white light. At the dichroic surface 122a, the green light component of the totally internally reflected light from TIR surface 120a is separated therefrom and reflected towards spatial light modulator 121, which is designated for modulating green light. As seen, the separated green light may experience TIR by TIR surface 120b in order to illuminate spatial light modulator 121 at a desired angle. This can be accomplished by arranging the incident angle of the separated green light onto TIR surface 120b larger than the critical TIR angle of TIR surface 120b. The rest of the light components, other than the green light, of the reflected light from the TIR surface 120a pass through dichroic surface 122a and are reflected at dichroic surface 122b. Because dichroic surface 122b is designated for reflecting red light component, the red light component of the incident light onto dichroic surface 122b is thus separated and reflected onto spatial light modulator 127, which is designated for modulating red light. Finally, the blue component of the white incident light (white light 126) reaches spatial light modulator 124 and is modulated thereby. By collaborating operations of the three spatial light modulators, red, green and blue lights can be properly modulated. The modulated red, green, and blue lights are recollected and delivered onto display target 116 through optic elements, such as projection lens 115, if necessary.

Figure 3:
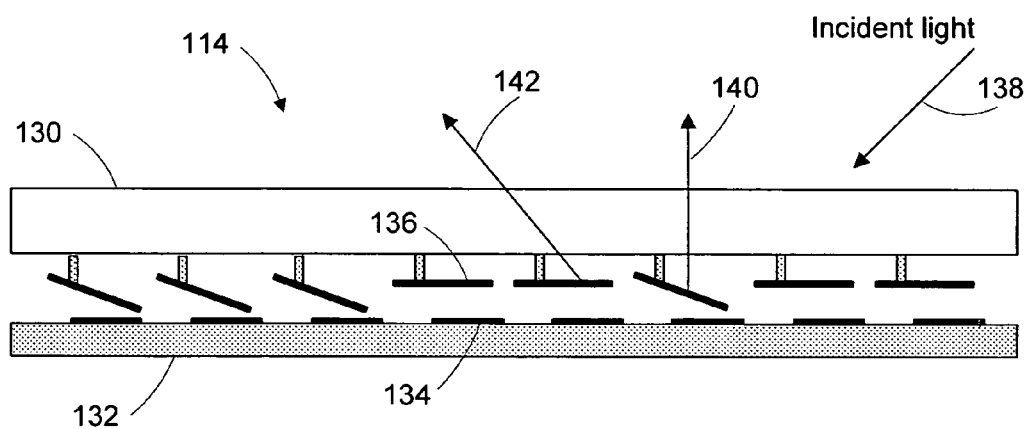
FIG. 3 is a cross-section view of a portion of an exemplary micromirror array in the spatial light modulators of FIGS. 1 and 2.

FIG. 3 illustrates a cross-section view of a simplified spatial light modulator in FIGS. 1 and 2. For simplicity and demonstration purposes, only 8 micromirror devices are presented therein. In this particular example, spatial light modulator 114 comprises an array of deflectable and reflective mirror plates such as mirror plate 136. The micromirrors are formed on substrate 130, which can be a light transmissive substrate, such as glass or quartz. For deflecting the micromirrors, an array of addressing electrodes (e.g. addressing electrode 134) is formed on semiconductor substrate 132, which is placed proximate to the micromirror array such that the mirror plates of the micromirrors can be deflected in response to electrostatic forces derived from electrostatic fields that are established between the mirror plates and addressing electrodes. The addressing electrode is connected to a voltage output node of a memory cell, such as a DRAM or a charge-pump memory cell such that the electrical potential, thus the voltage between the mirror plate and electrode if the electric potential of the mirror plate is fixed, can be uniquely determined and controlled by the data stored in the memory cell. A charge-pump memory cell comprises a transistor and a capacitor, wherein the first plate of the capacitor is connected to the drain of the transistor forming a voltage output node, and the second plate of the capacitor is connected to a pumping signal whose voltage varies over time during operation. The gate of the transistor is connected to a wordline, and the source of the transistor is connected to a bitline, as set forth in U.S. patent application Ser. No. 10/340,162 to Richards filed Jan. 10, 2003, the subject matter being incorporated herein by reference. Operations of the memory cells using pulse-width-modulation technique is set forth in U.S. Pat. No. 6,388,661 issued May 14, 2002, and U.S. paten application Ser. No. 10/607,687 filed May 27, 2003, and U.S. patent application Ser. No. 10/865,993 filed May 11, 2004, both to Richards, the subject matter of each being incorporated herein by reference. In operation, the data in the memory cell are updated according to the image data, such as the bit plane data of the image produced by the pulse-width-modulation. Such data in the memory cell reflects in the voltage on the addressing electrode, and in turn, determines the ON and OFF state of the mirror plate to which the electrode is associated. At the ON /or OFF state, the mirror plate reflects illumination light 138 either onto (e.g. 140) or away (e.g. 142) from the display target, producing a dark or bright image pixel in the display target.

Figure 4:
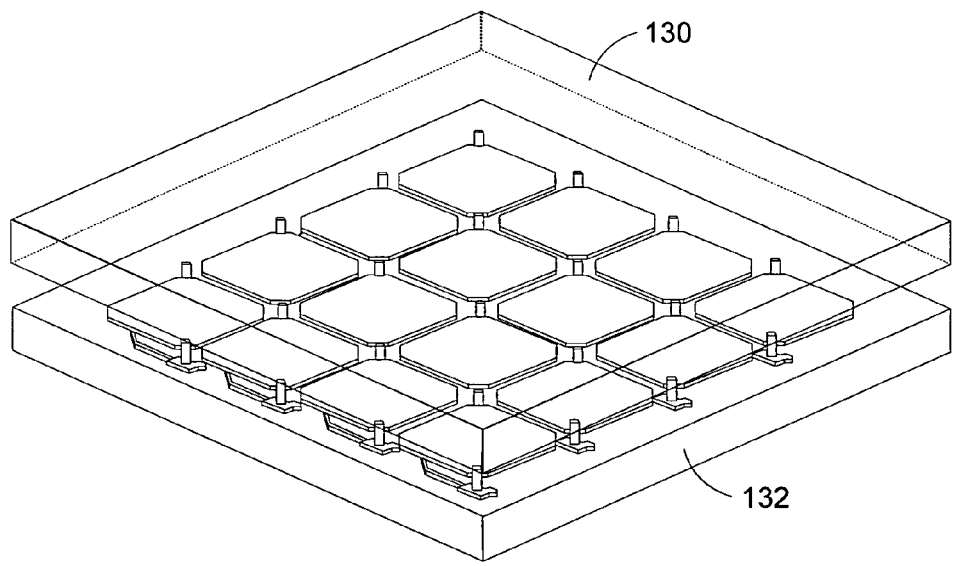
FIG. 4 is a perspective view of a portion of an exemplary micromirror array device.

In general, the micromirror array of a spatial light modulator consists of hundreds of thousands or even millions of micromirrors, the total number of which determines the resolution of the displayed images. For example, the micromirror array of the spatial light modulator may have 1024× 768, 1280×720, 1400×1050, 1600×1200, 1920×1080, or even larger number of micromirrors. In other applications, the micromirror array may have fewer numbers of micromirrors. FIG. 4 demonstratively illustrates a perspective view of an exemplary spatial light modulator in FIG. 3. Referring to FIG. 4, an array of micromirrors is formed on light transmissive substrate 130, while an array of addressing electrodes is formed on silicon substrate 132 that is placed proximate to the micromirrors on substrate 130. The two substrates are aligned (e.g. such that each mirror plate is associated with an addressing electrode) and bonded together. The distance between the substrates, thus the distance between the mirror plates and addressing electrodes can be maintained by, for example, posts deployed between the substrates and within the micromirror array and/or the addressing electrode array. Alternatively, the distance between the two substrates can be maintained by pillars (e.g. spacer rings) between the substrates and along the circumferences of the substrate, which is not shown in the figure.

In the above example, the micromirrors are formed on light transmissive substrate 130 separate from substrate 132 on which the addressing electrodes are formed. Alternatively, the micromirrors and the addressing electrodes can be formed on the same substrate, preferably a semiconductor wafer, such as semiconductor substrate 132. In another embodiment of the invention, the micromirror substrate can be bonded to a transfer substrate, and then the micromirror substrate along with the transfer substrate is attached to another substrate such as a silicon substrate having electrodes and circuits formed thereon followed by removal of the transfer substrate and patterning of the micromirror substrate to form the micromirrors, other micromirror designs and methods are also possible, which will not be discussed in detail.

Figure 5:
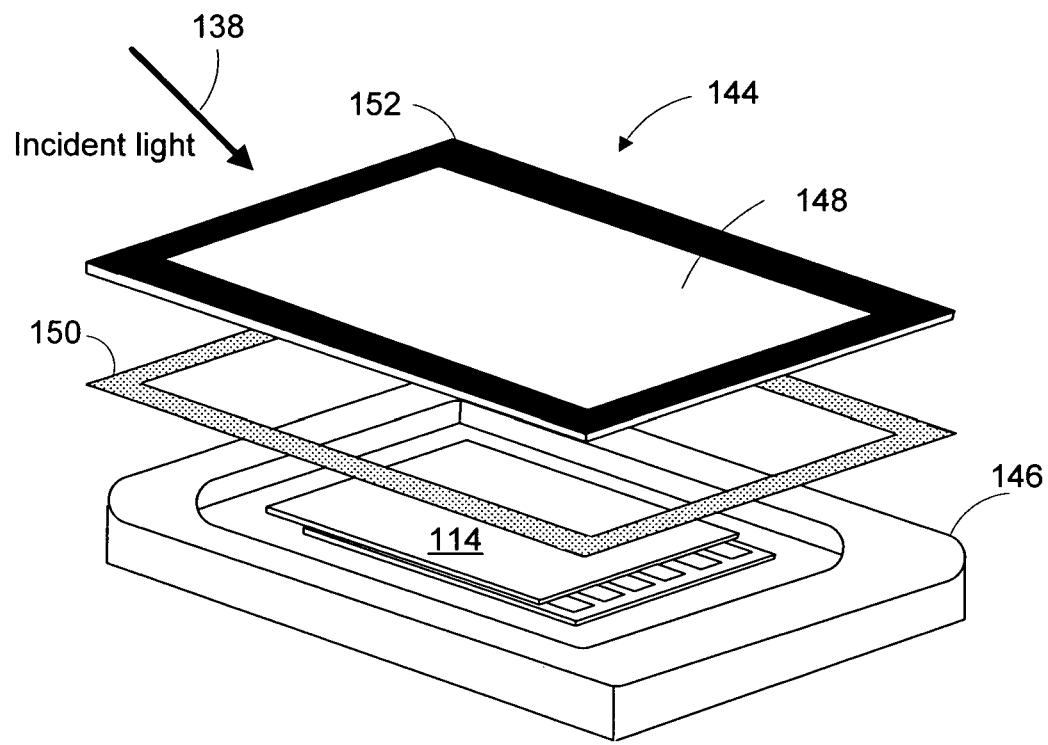
FIG. 5 illustrates components of an exemplary micromirror array device package in which embodiments of the invention can be implemented.

The micromirror array device is often packaged for protection purposes. An exemplary device package is illustrated in FIG. 5, as set forth in U.S. patent application Ser. No. 10/443,318 to Tam filed May 22, 2003, the subject matter being incorporated herein by reference. Referring to FIG. 5, micromirror array device 114 is sealed within the space between package cover 148 and package substrate 146 that is bonded to the package cover via sealing medium 150. The package cover is transmissive to the illumination light. Light blocking/absorbing mask 152 on the package cover define a window (aperture) through which the illumination light is incident onto the micromirrors and is modulated thereby. In the embodiment of the invention, the light absorbing block/absorbing mask is capable of blocking or absorbing 85% or more, or 95% or more, or more preferably 97% or more of the illumination light incident thereto.

In this particular example, the package substrate comprises a cavity in which the micromirror array device is positioned. Alternatively, the package substrate can be a flat substrate, and is bonded to the package cover via a spacer ring, which is not illustrated.

Figure 6:
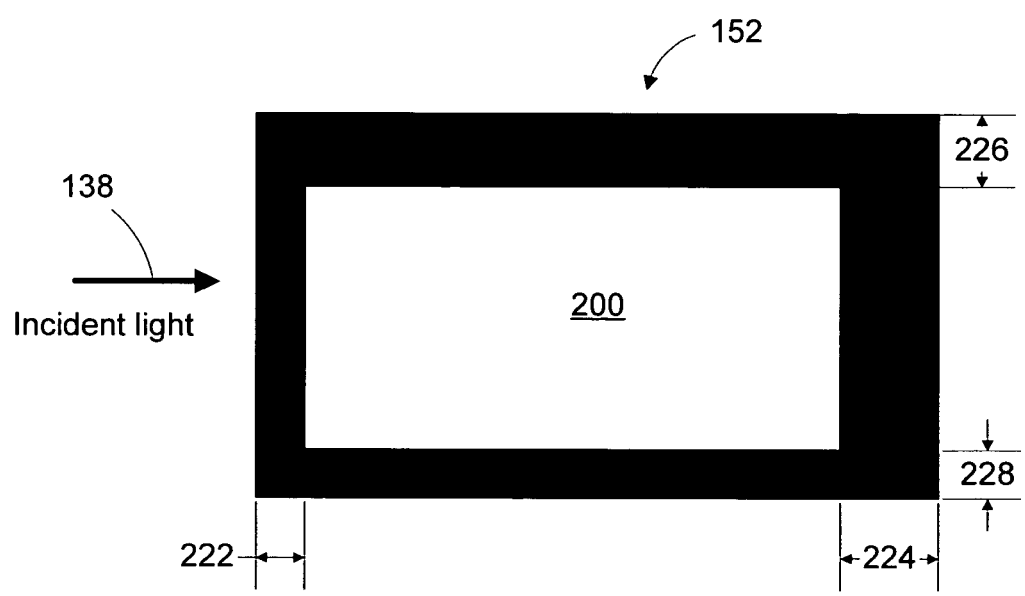
FIG. 6 illustrates a top view of the asymmetric light absorbing mask in FIG. 5.

In accordance with an embodiment of the invention, the light absorbing mask is asymmetric, as shown in FIG. 6. Referring to FIG. 6, light absorbing/blocking strips 222, 224, 226, and 228 on the borders of mask 152 have different widths, and the difference preferably accords to the arrangement of the illumination light beam that is incident at an angle to the micromirrors, thus an angle to the plane of the window defined by the mask. For example, strips 222 and 224 corresponding to the trailing and leading edges of the illumination light beam 138 have different widths. Strips 226 and 228 whose lengths are along the illumination light beam may or may not have the same width. Window 200 so defined by the strips is offset from the center of mask 152. Specifically, the geometric center of the window is offset form the geometric center of the package cover. As a way of example, the offset comprises an offset of 1.5% or more, such as 5% or more, or 10% or more of the length of the package cover, or an offset of 1.5% or more, such as 5% or more, or 10% or more of the width of the package cover, or a combination thereof.

The micromirror array device (e.g. device 114) can be positioned on the package substrate with its center aligned to the center window 200. Because of the offset of the window to the package cover (and the mask), the micromirror array device is offset from the center of package cover 148. The micromirror array device may also be offset from the center of the supporting surface of the package substrate. The advantage of the asymmetric light absorbing/blocking mask is better illustrated in FIG. 7.

Figure 7:
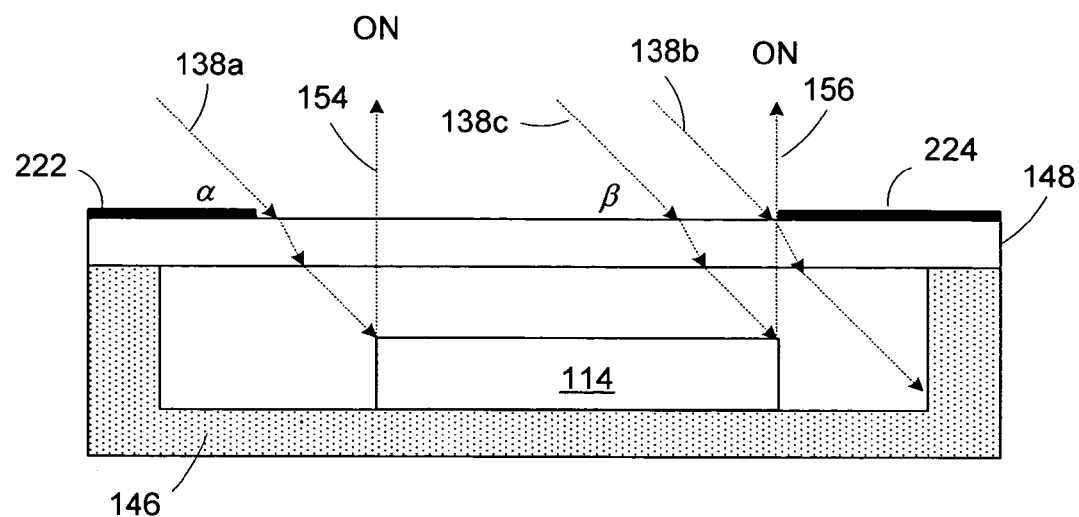
FIG. 7 is a cross-section view of the package in FIG. 5.

Referring to FIG. 7, a cross-sectional view of micromirror array device package 144 in FIG. 5 is illustrated therein. The illumination light is incident to the micromirror array device at an angle and limited by the light absorbing mask. Specifically, strips 222 and 224 of light absorbing mask 152 (as shown in FIG. 6) respectively define leading edges 138a and trailing edge 138b of the illumination light allowed for entering into the package and shining on the micromirrors. The leading and trailing edges of the illumination light present incident angles $\alpha$ and $\beta$ to the window surface. The angles may or may not be the same. For example, when the window is parallel to the micromirror array and the illumination light is within a light cone, which often occurs in practical operation, angles $\alpha$ and $\beta$ are different.

For most efficiently utilizing the illumination light entering into the package while allowing all reflected light from the ON state of the micromirrors, the footprint of the illumination light between leading edge 138a and effective trailing edge 138c on the micromirror array substantially covers all micromirrors in the micromirror array, and the micromirror array is illuminated by such footprint in its entirety such that no illumination light is wasted. The effective trailing edge 138c, which is different from the trailing edge 138b, is such a boundary that the illumination light within 138c and 138a can escape from the package after reflection by the micromirrors in the ON state, while the illumination light otherwise are blocked within the package after reflection by the micromirrors in the ON state. As shown in the figure, reflected light 156 of the incident illumination light along effective trailing edge 138b is tangent to the edge of strip 224. Such configuration can be accomplished in many ways.

For example, the strips can be adjusted according to the given position of the micromirror array device with in the package. Alternatively, the position of the micromirror array device can be adjusted according to the given window defined by the strips of the light blocking/absorbing mask. Or the position of the micromirror array device and the window can be both adjusted relatively. In any situation, the micromirror array is offset from the window defined by the light absorbing/blocking mask, as illustrate in FIGS. 8 to 11.

Figure 8:
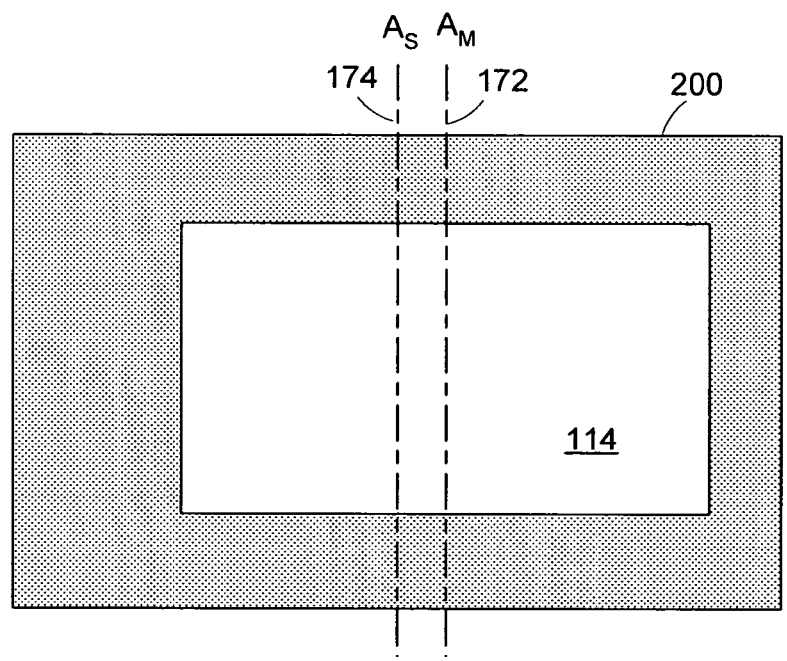
FIG. 8 is a top view of the micromirror array and the opening window defined by the mask in FIG. 5 according to an embodiment of the invention.

Referring to FIG. 8, micromirror array device 114 has an in-plane symmetrical axis 172 that is offset from an in-plane symmetrical axis 174 of window 200 defined by the mask as shown in FIG. 6 when viewed from the top of the window. The two in-plane symmetrical axes may or may not be parallel to each other. For example, the micromirror array device can be rotated along an axis parallel to its normal direction relative to the supporting surface of the package substrate. The edges of the micromirror array device are not parallel to the edges of the supporting surface.

Figure 9:
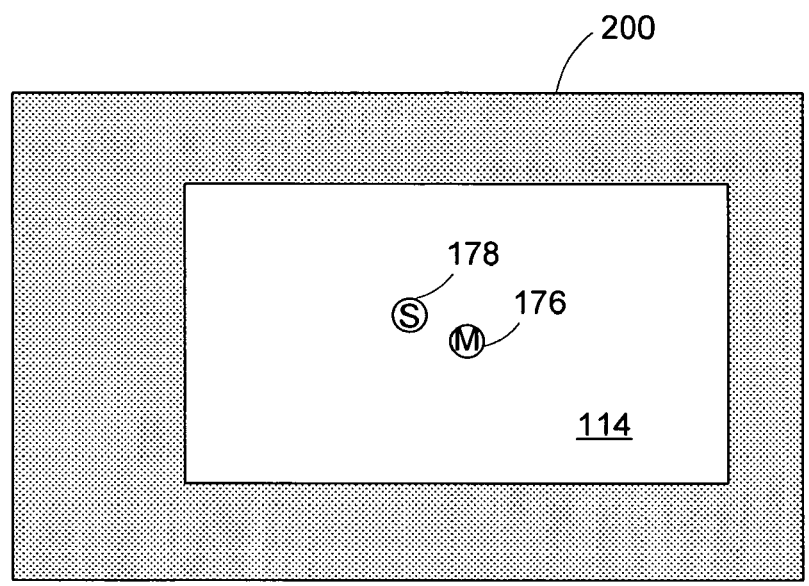
FIG. 9 is a top view of the micromirror array and the opening window defined by the mask in FIG. 5 according to another embodiment of the invention.

In another example, micromirror array device 114 is positioned such that its geometric center 176 is offset from center 178 of window 200 defined by the light absorbing/blocking mask, as shown in FIG. 9. As an aspect of this embodiment, the micromirror array device can also be positioned such that the micromirror array device is rotated along an axis parallel to its normal direction relative to window 200.

Figure 10:
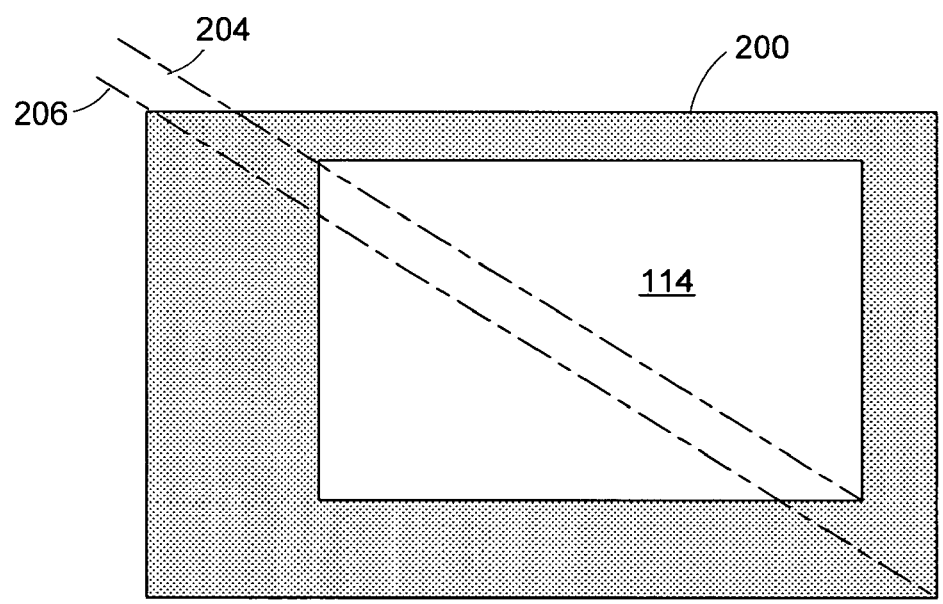
FIG. 10 is a top view of the micromirror array and the opening window defined by the mask in FIG. 5 according to yet another embodiment of the invention.

In yet another example, the micromirror array device is positioned such that an diagonal of the micromirror array device is offset but parallel to the corresponding diagonal of window 200 defined by the light absorbing/blocking mask, as shown in FIG. 10. Specifically, diagonal 204 of micromirror array device 114 is offset from diagonal 206 of window 200. The two diagonals can be parallel to each other.

As a way of example, the offset of the in-plane asymmetric axis 172 in relation to axis 174 in FIG. 8, or the offset of the geometric center 176 in relation to center 178 in FIG. 9, or the offset (distance) of diagonal 204 of the micromirror array relative to diagonal 206 of window 200 in FIG. 10, can be 1.5% or more, or 5% or more, or 10% or more, or 20% or more of the total number of columns in the micromirror array device. Alternatively, the offset can be 50 columns or more, such as 100 columns, or 150 columns or more of the micromirror array device.

Figure 11:
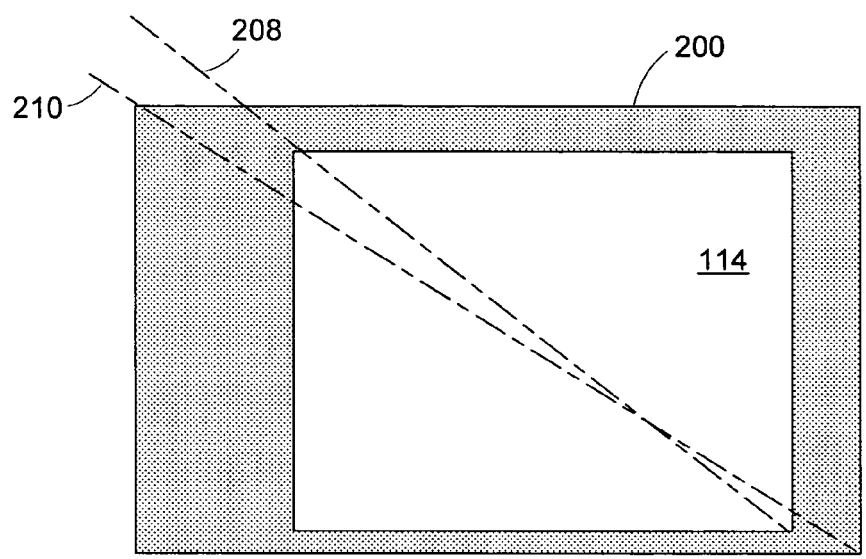
FIG. 11 is a top view of the micromirror array and the opening window defined by the mask in FIG. 5 according to yet another embodiment of the invention.

In still yet another embodiment of the invention, the two diagonals can be crossed, as shown in FIG. 11. Referring to FIG. 11, diagonal 208 of micromirror array 114 is not parallel to diagonal 210 of window 200. The crossing of the two diagonals can be within the micromirror array device as illustrated in the figure, or can be outside the micromirror array device but within window 200 when viewed from the top of the window, or can be outside both of the window and micromirror array device, depending upon the specific displacement scheme of the micromirror array device in relation to the window.

In addition to the light absorbing/blocking mask, the micromirror array device may comprise active and inactive micromirrors. The operation states of the inactive micromirrors are not related to the image data, such as the bitplane data derived from applications of a pulse-width-modulation algorithm on the desired image. In contrast, operations of the active micromirrors are associated with the image data of the desired image. The inactive micromirrors can be constantly at the OFF state, resulting in black or dark areas in the display target so as to enhance the viewing quality of the displayed image. Specifically when being arranged around the circumference of the micromirror array and surrounding the active micromirrors, the resulting black or dark areas in the display target can be advantageous for achieving high contrast ratio. The inactive micromirrors can be resulted from displaying images of an aspect ratio different from the default aspect ratio of the micromirror array device. For example, when a micromirror array of a default aspect ratio (e.g. 4:3) is used to display images of an irregular aspect ratio (e.g. 16:9), or vice versa, not every micromirror in the micromirror array corresponds to an image pixel of the desired image. These unassociated micromirrors become inactive micromirrors in that particular display application. The inactive micromirrors may also be a consequence from manufacturing of the micromirror array. In practical manufacturing, the micromirrors are often fabricated with an aid of sacrificial materials, which were deposited during formation of the structures of the micromirrors, and removed afterwards. Removal of the sacrificial materials, such as through vapor phase chemical etching with selected spontaneous vapor phase etchants, is often accompanied by so-named "proximity etching effect" wherein micromirrors in the vicinity of the edge of the micromirror array are etched differently from the inner micromirrors. As a result, the micromirrors around the circumference of the micromirror array behave differently from the inner micromirrors. For this and among other reasons, extra micromirrors enclosing the desired micromirrors can be designed and fabricated along with the desired micromirrors. These extra micromirrors will be operated as inactive micromirrors.

Figure 12:
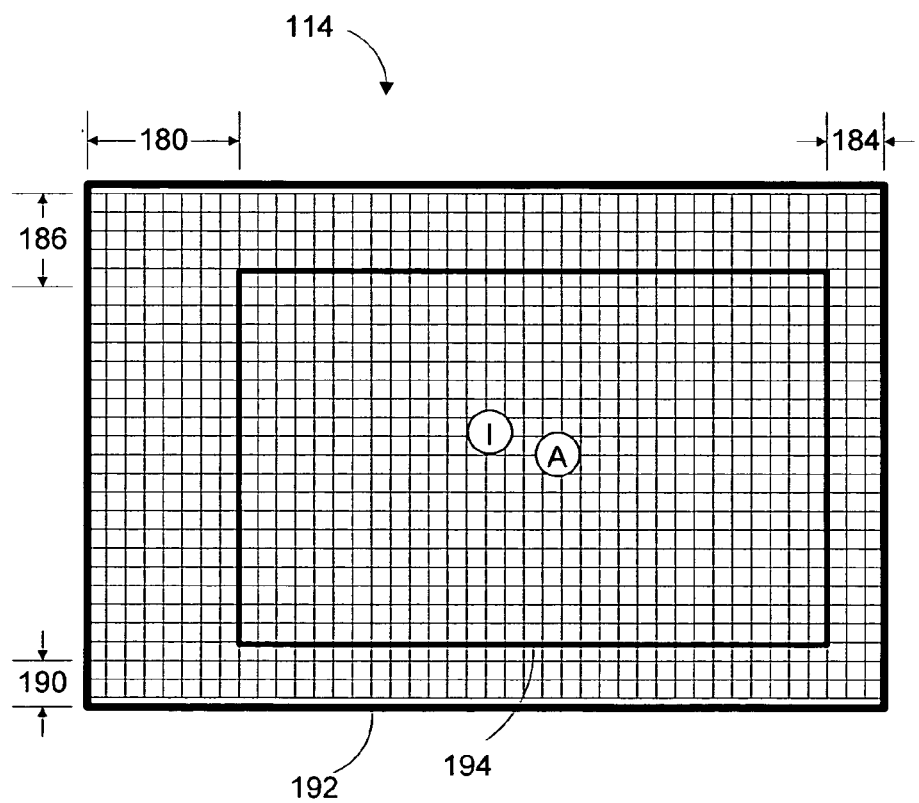
FIG. 12 is a top view of the micromirror array having an inactive area and an active area that is not aligned to the center of the micromirror array according to an embodiment of the invention.

In accordance with yet another embodiment of the invention, the active region (a region having the active micromirrors) is not at the center of the micromirror array, as shown in FIG. 12. Referring to FIG. 12, micromirror array 114 comprises active area 194 and inactive areas 192. The active area is asymmetrically disposed within the micromirror array. Specifically, the geometric center A of the active area is offset from the geometric center I of the inactive area. The inactive segments 180 and 184 have different numbers of columns of inactive micromirrors. The inactive segments 186 and 190 may have different numbers of rows of inactive micromirrors as well.

Figure 13:
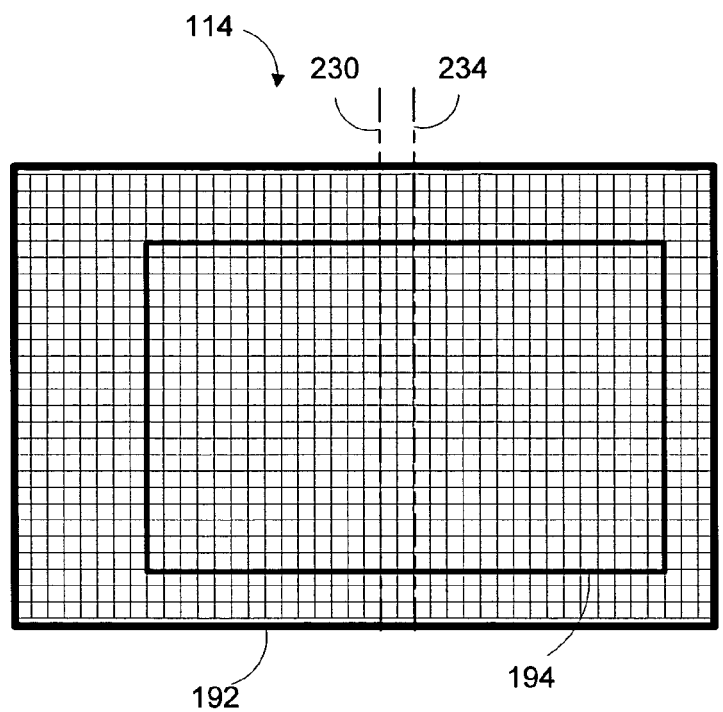
FIG. 13 is a top view of the micromirror array having an inactive area and an active area that is not aligned to the center of the micromirror array according to another embodiment of the invention.

As yet another example, the in-plane symmetrical axis 234 of active area 194 can be offset from the in-plane symmetrical axis 230 of the entire micromirror array device 114 as illustrated in FIG. 13. The two in-plane symmetrical axes may or may not be parallel to each other.

Figure 14:
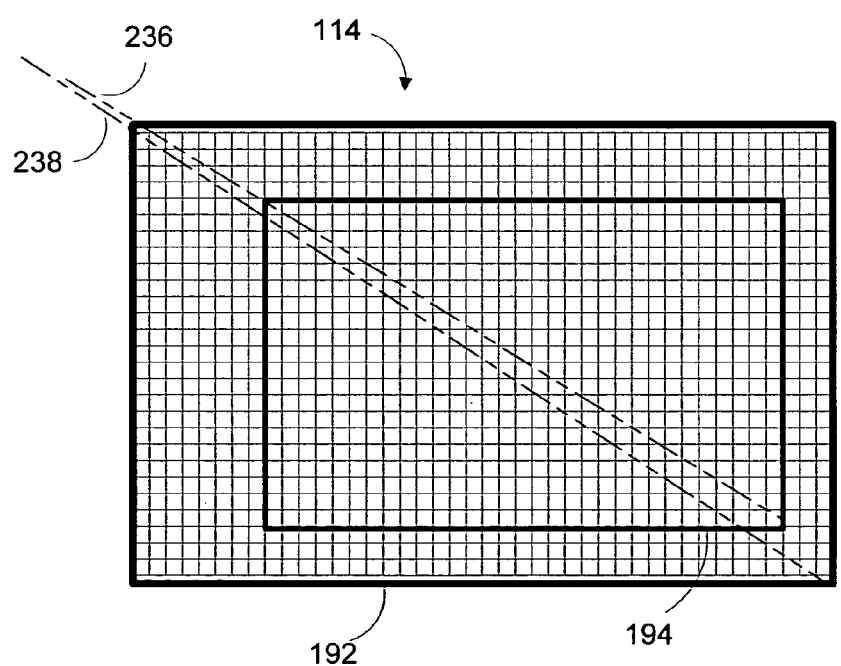
FIG. 14 is a top view of the micromirror array having an inactive area and an active area that is not aligned to the center of the micromirror array according to yet another embodiment of the invention.

As yet another example, a diagonal of the active area can be offset from the corresponding diagonal of the entire micromirror array device as shown in FIG. 14. Referring to FIG. 14, diagonal 236 of the active area is offset from and not parallel to diagonal 238 of micromirror array 114. Alternatively, the two diagonals can be offset from but parallel to each other, which is not shown in the figure.

In the above examples, the offset of the geometric center A relative to geometric center I in FIG. 12, or the offset of the two in-plane symmetrical axes in FIG. 13, or the offset of diagonals 236 and 238 in FIG. 14, may comprise an offset of 1.5% or more, or 5% or more, or 10% or more, or 20% or more of the total number of columns in the micromirror array device, or an offset of 1.5% or more, or 5% or more, or 10% or more, or 20% or more of the total number of rows in the micromirror array device, or a combination thereof. Alternatively, the offset may comprise an offset of 50 columns or more, such as 100 columns or more, or 150 columns or more of the micromirror array device, or an offset of 50 rows or more, such as 100 rows or more, or 150 rows or more of the micromirror array device, or a combination thereof. The offset may include offset along the rows and offset along the columns of the micromirror array.

In addition to the offsets of the micromirror relative to the package cover and/or the window and/or the supporting surface, and the offsets of the active area relative to the inactive area, and/or the entire micromirror array, other offsets may exist. For example, the active area may be offset form the window; and the mask may be offset from the package cover.

It will be appreciated by those skilled in the art that a new micromirror package has been disclosed. In view of the many possible embodiments to which the principles of this invention may be applied, however, it should be recognized that the embodiments described herein with respect to the drawing figures are meant to be illustrative only and should not be taken as limiting the scope of invention. For example, all of the disclosed methods are applicable to a spatial light modulator that is comprised of liquid crystal device (e.g. transmissive LCDs or reflective LCOS) instead of a micromirror array. Therefore, the invention as described herein contemplates all such embodiments as may come within the scope of the following claims and equivalents thereof.

We claim:

1. A package of a spatial light modulator having an array of pixels having a micromirror array, comprising:
   a window transmissive to the incident light to be modulated; and
   a package substrate on which the pixel array is positioned, wherein the geometric center of the micromirror array is offset from the geometric center of the window when viewed from the top of the window.

2. The package of claim 1, wherein each pixel of the pixel array comprises a reflective and deflectable micromirror.

3. The package of claim 2, wherein the window is defined by a light blocking mask on a package cover of the package.

4. The package of claim 3, wherein the geometric center of the window is offset from the geometric center of the package cover.

5. The package of claim 2, wherein an in-plane symmetric axis of the micromirror array is offset from but parallel to an in-plane symmetric axis of the window.

6. The package of claim 5, wherein a diagonal of the micromirror array is offset from but parallel to a diagonal of the window.

7. The package of claim 2, wherein the micromirror array has no diagonal that is parallel to a diagonal of the window.

8. The package of claim 2, wherein the offset comprises 1.5% or more of the total number of columns of the micromirror array.

9. The package of claim 8, wherein the offset comprises 1.5% or more of the total number of rows and/or columns of the micromirror array.

10. The package of claim 2, wherein the offset comprises 5% or more of the total number of columns of the micromirror array.

11. The package of claim 2, wherein the offset comprises 10% or more of the total number of columns of the micromirror array.

12. The package of claim 2, wherein the offset comprises 50 or more of the columns of the micromirror array.

13. The package of claim 12, wherein the offset comprises 50 or more of the rows of the micromirror array.

14. The package of claim 2, wherein the offset comprises 100 or more of the columns of the micromirror array.

15. The package of claim 2, wherein the offset comprises 150 or more of the columns of the micromirror array.

16. The package of claim 2, wherein the package substrate comprises a cavity having a supporting surface on which the micromirror array device is positioned; and
   wherein the geometric center of the micromirror array is offset from the geometric center of the supporting surface.

17. The package of claim 16, wherein no major edge of the micromirror array is parallel to a major edge of the supporting surface.

18. The package of claim 2, wherein the micromirror array comprises a number of active micromirrors and a number of inactive micromirrors; wherein each active micromirror is operated according image data of a desired image; and each inactive micromirror is operated irrelevant to the image data; and wherein an inactive area having the inactive micromirrors is offset from an active area having the active micromirrors.

19. The package of claim 18, wherein the geometric center of the active area is offset from the geometric center of the entire micromirror array.

20. The package of claim 19, wherein the geometric center of the active area is offset from the geometric center of the package cover.

21. The package of claim 19, wherein the geometric center of the active area is offset form the geometric center of the window.

22. The package of claim 18, wherein the active area has an aspect ratio of 4:3.

23. The package of claim 18, wherein the active area has an aspect ratio of 16:9.

24. A display system, comprising:
   a light source providing illumination light for the system;
   a spatial light modulator having a package of a pixel array in claim 1 for modulating the illumination light so as to produce a desired image;
   a plurality of optical elements for directing the illumination light onto and away from the spatial light modulator; and
   a display target on which the desired image is produced.

25. The display system of claim 24, further comprising: a color filter for producing sequential illumination light beams of primary colors.

26. The display system of claim 25, further comprising: a light integrator that is placed between the light source and the color filter.

27. The display system of claim 25, further comprising: a light integrator that is placed after the light source and the color filter at a propagation path of the illumination light.

28. A spatial light modulator, comprising:
   a pixel array, comprising an active area that includes an array of active pixels having a micromirror array whose operation states are associated with image data of a desired image, wherein the geometric center of the active area is offset from the geometric center of the entire micromirror array when viewed from the top of the micromirror array.

29. The spatial light modulator of claim 28, wherein a pixel of the pixel array comprises a reflective and deflectable micromirror.

30. The spatial light modulator of claim 29, wherein the offset is characterized by 1.5% or more of the total number of columns and/or rows of the micromirror array.

31. The spatial light modulator of claim 29, wherein the offset is characterized by 1.5% or more of the total number of rows of the micromirror array.

32. The spatial light modulator of claim 29, wherein the offset is characterized by 5% or more of the total number of columns of the micromirror array.

33. The spatial light modulator of claim 29, wherein the offset is characterized by 10% or more of the total number of columns of the micromirror array.

34. The spatial light modulator of claim 29, wherein the offset is characterized by 50 columns or more of the columns of the micromirror array.

35. The spatial light modulator of claim 34, wherein the offset is characterized by 50 columns or more of the rows of the micromirror array.

36. The spatial light modulator of claim 29, wherein the offset is characterized by 100 columns or more of the columns of the micromirror array.

37. The spatial light modulator of claim 29, wherein the offset is characterized by 150 columns or more of the columns of the micromirror array.

38. The spatial light modulator of claim 29, further comprising:
   a package substrate having a supporting surface on which the micromirror array is positioned;
   a package cover having a window transmissive to an incident light to be modulated; and wherein the geometric center of the active area is offset from the geometric center of the window.

39. The spatial light modulator of claim 38, wherein the geometric center of the active area is offset from the geometric center of the package cover.

40. The spatial light modulator of claim 38, wherein the supporting surface is a surface of a cavity in the package substrate; and wherein the package cover is bonded to the package substrate.

41. A projection system, comprising:
an illumination system providing illumination light for the system;
a spatial light modulator of claim 28 for modulating the illumination light so as to produce an image; and
a display target on which the produced image is displayed.

42. A package of a spatial light modulator, comprising:
a pixel array, comprising an active area that includes an array of active pixels whose operation states are associated with image data of a desired image;
a package substrate having a supporting surface on which the pixel array is positioned;
a package cover having a window transmissive to the incident light to be modulated;
wherein the geometric center of the active area is offset from the geometric center of the window when viewed from the top of the window.

43. The package of claim 42, wherein each pixel of the pixel array comprises a deflectable reflective micromirror.

44. The spatial light modulator of claim 43, wherein the offset is characterized by 1.5% or more of the total number of columns and/or rows of the micromirror array.

45. The spatial light modulator of claim 43, wherein the offset is characterized by 1.5% or more of the total number of rows of the micromirror array.

46. The spatial light modulator of claim 43, wherein the offset is characterized by 5% or more of the total number of columns of the micromirror array.

47. The spatial light modulator of claim 43, wherein the offset is characterized by 10% or more of the total number of columns of the micromirror array.

48. The spatial light modulator of claim 43, wherein the offset is characterized by 50 columns or more of the columns of the micromirror array.

49. The spatial light modulator of claim 48, wherein the offset is characterized by 50 columns or more of the rows of the micromirror array.

50. The spatial light modulator of claim 43, wherein the offset is characterized by 100 columns or more of the columns of the micromirror array.

51. The spatial light modulator of claim 43, wherein the offset is characterized by 150 columns or more of the columns of the micromirror array.

52. The spatial light modulator of claim 43, wherein the geometric center of the active area is offset from the geometric center of the package cover.

53. The spatial light modulator of claim 43, wherein the geometric center of the active area is offset from the geometric center of the entire micromirror array.

54. A package, comprising:
a package substrate having a supporting surface on which a pixel array is positioned; and
a package cover having a window transmissive to light to be modulated, wherein the geometric center of the window is offset from the geometric center of the package cover.

55. The package of claim 54, wherein each pixel comprises a deflectable and reflective micromirror.

56. The package of claim 55, wherein the offset comprises 1.5% or more of the length and/or the width of the package cover.

57. The package of claim 56, wherein the offset comprises 1.5% or more of the width of the package cover.

58. The package of claim 55, wherein the offset comprises 5% or more of the length of the package cover.

59. The package of claim 55, wherein the offset comprises 10% or more of the length of the package cover.

60. The package of claim 55, wherein the geometric center of the pixel array is offset from the geometric center of the package cover.

61. The package of claim 55, wherein the geometric center of the pixel array is offset from the geometric center of the window.

62. The package of claim 55, wherein the geometric center of the pixel array comprises an active area having an array of active pixels whose operation states are associated with image data of a desired image, wherein the geometric center of the active area is offset from the geometric center of the package cover.

63. The package of claim 55, wherein the geometric center of the pixel array comprises an active area having an array of active pixels whose operation states are associated with image data of a desired image, wherein the geometric center of the active area is offset from the geometric center of the window.

64. The package of claim 55, wherein the geometric center of the pixel array comprises an active area having an array of active pixels whose operation states are associated with image data of a desired image, wherein the geometric center of the active area is offset from the geometric center of the entire pixel array.

65. A package, comprising:
a package substrate having a supporting surface on which a pixel array is positioned, wherein the pixel array comprises an active area having an array of active pixels whose operation states are associated with image data of a desired image;
a package cover having a window transmissive to light to be modulated; and
wherein the geometric center of the active area is offset from the geometric center of the window.

66. The package of claim 65, wherein the pixel comprises a deflectable and reflective micromirror.

67. The package of claim 66, wherein the offset comprises 1.5% or more of the length of the window.

68. The package of claim 67, wherein the offset comprises 1.5% or more of the width of the window.

69. The package of claim 66, wherein the offset comprises 5% or more of the length of the window.

70. The package of claim 66, wherein the offset comprises 10% or more of the length of the window.

71. The package of claim 66, wherein the geometric center of the pixel array is offset from the geometric center of the package cover.

* * * * *